United States Patent
Ooi et al.

(10) Patent No.: US 8,562,805 B2
(45) Date of Patent: Oct. 22, 2013

(54) METHOD OF ACTUATING AND AN ACTUATOR

(75) Inventors: Kim Tiow Ooi, Singapore (SG); Chun Yang, Singapore (SG); Teck Neng Wong, Singapore (SG); Xiaoyang Huang, Singapore (SG); Marcos, Singapore (SG); Yuejun Kang, Singapore (SG)

(73) Assignee: Nanyang Technological University, Singapore (SG)

( * ) Notice: Subject to any disclaimer, the term of this patent is extended or adjusted under 35 U.S.C. 154(b) by 2008 days.

(21) Appl. No.: 10/579,684

(22) PCT Filed: Nov. 17, 2004

(86) PCT No.: PCT/SG2004/000371
§ 371 (c)(1),
(2), (4) Date: May 17, 2006

(87) PCT Pub. No.: WO2005/049480
PCT Pub. Date: Jun. 2, 2005

(65) Prior Publication Data
US 2007/0144906 A1    Jun. 28, 2007

Related U.S. Application Data

(60) Provisional application No. 60/520,643, filed on Nov. 18, 2003.

(51) Int. Cl.
*G01N 27/27* (2006.01)
*B81B 7/00* (2006.01)
(52) U.S. Cl.
USPC ............ 204/600; 204/601; 204/606; 204/660

(58) Field of Classification Search
USPC .................................. 204/600, 601, 606, 660
See application file for complete search history.

(56) References Cited

U.S. PATENT DOCUMENTS

| | | | | |
|---|---|---|---|---|
| 5,362,213 | A * | 11/1994 | Komatsu et al. | 417/418 |
| 6,277,257 | B1 | 8/2001 | Paul et al. | |
| 6,537,437 | B1 * | 3/2003 | Galambos et al. | 204/600 |
| 7,708,872 | B2 * | 5/2010 | Eidsnes et al. | 204/451 |

OTHER PUBLICATIONS

PCT International Search Report for PCT Counterpart Application No. PCT/SG2004/000371 containing Communication relating to the Results of the Partial International Search Report, 2 pgs., (Feb. 2, 2005).

D.J. Laser, et al., "A Review of Micropumps," Journal of Micromechanics and Microengineering, vol. 14, No. 6, pp. R35-R64, (Apr. 19, 2004).

(Continued)

*Primary Examiner* — Arun S Phasge
(74) *Attorney, Agent, or Firm* — Blakely, Sokoloff, Taylor & Zafman LLP (57) ABSTRACT

A method of actuating, comprising: filling at least a portion of a tube (21) with a liquid (19) containing electrolytes, the tube (21) having an inner surface that is electrically chargeable when in contact with the liquid (19); positioning an object (28) in fluid communication with the liquid in the tube; and applying an electrical field (46) along a lengthwise axis across the tube at said portion for producing a pressure in the liquid. The pressure in the liquid exerts a force on the object so as to actuate the object (28, 30). An actuator (20) is also disclosed.

13 Claims, 5 Drawing Sheets (56) References Cited

OTHER PUBLICATIONS

Shulin Zeng, et al., "Fabrication and Characterization of Electroosmotic Micropumps," Sensors and Actuators B: Chemical, vol, 79, Issues 2-3, pp. 107-114, (Oct. 15, 2001).

Lingxin Chen, et al., "Generating High-Pressure Sub-Microliter Flow Rate in Packed Microchannel by Electroosmotic Force: Potential Application in Microfluidic Systems," Sensors and Actuators B: Chemical, vol. 88, Issue 3, pp. 260-265, (Feb. 10, 2003).

Written Opinion for PCT/SG2004/000371, mailed Jul. 1, 2005, 4 pages.

International Preliminary Examination Report for PCT/SG2004/000371, mailed Aug. 1, 2005, 8 pages.

Paul et al., Electrokinetic Generation of High Pressures Using Porous Microstructures, Proceedings of the Micro Total Analysis Systems '98 Workshop, Banff, Canada, 1998, pp. 49-52.

S. Yao et al., A Large Flowrate Electroosmotic Pump with Micro Pores, Proceedings of IMECE, ASME, New York, NY, 2001, 7 pages.

* cited by examiner

METHOD OF ACTUATING AND AN ACTUATOR

CROSS-REFERENCE TO OTHER APPLICATIONS

This is a National Phase of International Application No. PCT/SG2004/000371, filed on Nov. 17, 2004, which claims priority from U.S. Provisional Patent Application No. 60/520,643, filed on Nov. 18, 2003.

FIELD OF INVENTION

This invention relates to a method of actuating and an actuator, and refers particularly, though not exclusively, to an electrokinetic actuator and method for fluids. The use of such a method and actuator is particularly relevant, though not exclusively so, for compressing gases or vapour, for transporting gases and vapors, for delivering non-conducting, non-polar liquids in micro-scaled channels, and for enhancing mixing in microfluidics.

BACKGROUND

Electroosmosis is an electrokinetic phenomenon that occurs when an electrolyte fluid interacts with solid surfaces causing a charged layer to form at the interface between the solid and the liquid. Immobilized electric charges develop at the surface of the solid surface in contact with the electrolyte fluid due to electro-chemical phenomena. The surface charge leads to the formation of an electric double layer ("EDL") by influencing the distribution of counter-ions and co-ions in the electrolyte fluid. In a diffuse layer of the EDL, the counter-ions predominate over the co-ions to neutralize the surface charge. As such, the local net charge density is not zero. A Columbic force is exerted on the ions within the EDL when an electric field is applied tangentially along the charged surface. Consequently, an electroosmotic flow (EOF) results whereby the migration of mobile ions will carry the adjacent and bulk liquid phase by viscosity.

The build-up of pressure as a result of electroosmosis facilitates the transport and manipulation of liquids in microfluidic devices for biomedical applications. These principles have been applied in the operation of many electroosmotic pumps. Such electroosmotic pumps work without movable mechanical parts, consequently improving durability and minimizing difficulties in production. Such electroosmotic pumps are essential for biochemical analyses as they enable the pumping of liquids over a wide range of fluid conductivities.

Given that electroosmosis is essentially a surface dominated phenomenon, the use of a porous structure with a high surface area-to-volume ratio can enhance the pressure-building capacity. Paul et al. [1998 Electrokinetic generation of high pressures using porous microstructures in: Proceedings of the Micro Total Analysis Systems '98 Workshop, Banff, Canada] proposed a method to generate high pressure using DC electroosmosis through a microchannel packed with microparticles. The pressure of 10 atm at 1.5 kV applied voltage has been achieved using fused-silica capillaries packed with charged 1.5 μm silica beads. S. Zeng et al, [Fabrication and Characterization of Electroosmotic Micropupms, Sensors and Actuators B 2001, 79, 107-114] fabricated an electroosmotic pump that can generate maximum pressures in excess of 20 atm or maximum flow rates of 3.6 μl/min by applying a 2 kV electric voltage over 5.4 cm long, 500-700 μm in diameter fused-silica capillaries packed with 3.5 μm silica particles. S. Yao et al, [A Large Flowrate Electroosmotic Pump with Micro Pores, Proceedings of IMECE, ASME, 2001, New York, N.Y.] developed an electroosmotic pump for a large flowrate with micro pores which can generate a maximum flowrate of 7 ml/min and a maximum pressure of 2.5 atm for 200V applied potential. In a recent development, L. Chen et al, [Generating High-Pressure Sub-Microliter Flow Rate in Packed Microchannel by Electroosmotic Force: Potential Application in Microfluidic Systems, Sensors and Actuators B 2003 88 260-265] developed a pump made of microchannels packed with porous fine dielectric material, which can generate a maximum pressure of 15 MPa.

The aforementioned sampling of documents show that the use of electroosmotic principles are commonly employed in micro-fluid pumping. Thus far, there has been no disclosure of the application of electroosmotic principles for actuation.

SUMMARY

According to a first preferred aspect there is provided a method of actuating, comprising: filling at least a portion of a tube with a liquid containing electrolytes, the tube having an inner surface that is electrically chargeable when in contact with the liquid; positioning an object in fluid communication with the liquid in the tube; and applying an electrical field along a lengthwise axis across the tube at said portion for producing a pressure in the liquid. The inner surface is advantageously electrically chargeable due to electrochemical phenomena. The pressure in the liquid exerts a force on the object so as to actuate the object. The tube may preferably be selected from a capillary tube or a micro-capillary tube. It is preferable that the tube has an open end and the object is in fluid communication with the liquid in the tube through the open end.

Preferably, there is an additional plurality of tubes each at least partially filled with a liquid containing electrolytes in fluid communication with the object, The plurality of tubes may be formed in a porous material. It is preferable that the porous material may be made from electrically non-conducting material such as silica or ceramic. The porous material may advantageously have one or more material properties such as a porous structure, micro capillaries, small particles, electrically non-conductive, and hydrophilic.

The electric field may be generated from AC or DC power supplies. It is advantageous that the DC power supply is linked to an on-off frequency controller. Advantageously, the pressure in the liquid is caused by electroosmotic flow.

A higher force on the object may be generated by preferably adopting techniques like using porous material with small pore sizes, using porous material with large cross-sectional areas, using a lower concentration of the liquid containing electrolytes, or by generating a stronger electric field.

There is also provided an actuator comprising: a tube with an inner surface and at least partially filled with a liquid containing an electrolyte, the inner surface being electrically chargeable when in contact with the liquid; an electric field generator for generating a field along a lengthwise axis of the tube for inducing a pressure in the tube; and an object in fluid communication with the liquid such that the pressure in the liquid exerts a force on the object for actuating the object. The inner surface may be electrically chargeable due to electrochemical phenomena and the pressure in the liquid exerts a force on the object so as to move the object. The tube may preferably be selected from either a capillary tube or a micro-capillary tube. Advantageously, the tube has an open end and the object is in fluid communication with the liquid in the tube through the open end. There may be an additional plurality of tubes each at least partially filled with a liquid, the liquid containing electrolytes in fluid communication with the object. The plurality of tubes may be formed in a porous material. The porous material may preferably be made from electrically non-conducting material selected from silica or ceramic. Advantageously, the porous material may have material properties such as hydrophilic, electrically non-conductive, porous structure, micro capillaries, and small particles.

The electric field generator may generate either AC or DC power. Preferably, the DC power supply is linked to an on-off frequency controller. In addition, The pressure in the liquid is preferably caused by electroosmotic flow.

A higher force on the object may be generated by adopting techniques such as using porous material with small pore sizes, using porous material with large cross-sectional areas, using a lower concentration of the liquid containing electrolytes, or by generating a stronger electric field.

Preferably, a housing defines a chamber containing the tube, and a cylinder in fluid communication with the chamber. The tube may be in the cylinder and the object may be a piston slideably mounted in the cylinder. It is preferable that the piston is biased to resist a force exerted thereon from the tube. The actuator may further comprising a displacement amplifier operatively connected to the piston.

Preferably, the piston has silicone seals. The actuator may further include a compensating piston to prevent a drop of pressure in the porous material. The actuator may advantageously further include a vent in the housing for allowing the exchange of air within the chamber.

DESCRIPTION OF DRAWINGS

In order that the invention may be better understood and readily put into practical effect, there shall now be described by way of non-limitative example only preferred embodiments of the present invention, the description being in reference to the accompanying illustrative drawings in which.

DESCRIPTION OF PREFERRED EMBODIMENTS

Figure 1:
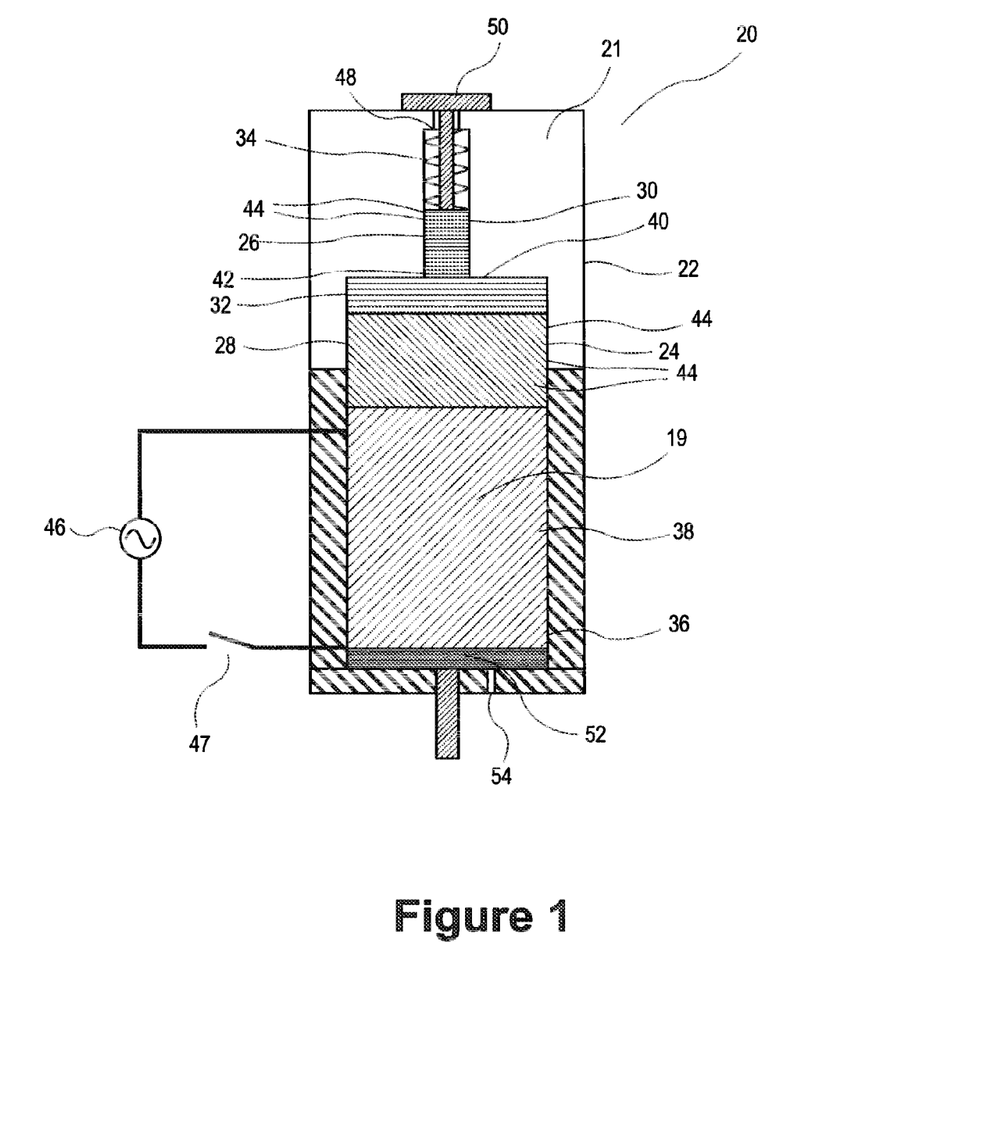
FIG. 1 is a schematic diagram of a preferred embodiment.

Referring to FIG. 1, there is provided a schematic diagram of an electrokinetic actuator 20. The actuator 20 may have a housing 22. The housing 22 may be of different cross-sectional shapes, such as, for example, circular, rectangular, approximating a square, polygonal, and the like. The housing 22 has a circular cross section forming a cylinder.

The housing 22 defines a chamber 21 that encases hydraulic fluid 19, a primary cylinder 24 and a secondary cylinder 26. The primary cylinder 24 and the secondary cylinder 26 have different bore diameters. The hydraulic fluid 19 acts as a damping medium. The primary cylinder 24 has a larger bore than the secondary cylinder 26. Correspondingly, a primary piston 28 in the primary cylinder 24 has a larger diameter than a secondary piston 30. There is also a primary retaining spring 32 and a secondary retaining spring 34 in the primary 24 and secondary 26 cylinders respectively. The primary retaining spring 32 prevents the primary piston 28 from contacting a top end 40 of the primary cylinder 24 and to return the primary piston 28 to a resting position. Similarly, the secondary retaining spring 34 prevents the secondary piston 30 from contacting a top end 48 of the secondary cylinder 26 and to return the secondary piston 30 to a resting position.

The primary 24 and secondary 26 cylinders may be connected as shown in FIG. 1. The top end 40 of the primary cylinder 24 may have an opening (not necessarily central) joining to a bottom end 42 of the secondary cylinder 26. The primary 24 and secondary 26 cylinders may be filled with hydraulic fluid that flows within the chambers of both the primary 24 and secondary 26 cylinders. The hydraulic fluid may also line the walls of the chambers of both the primary 24 and secondary 26 cylinders as a lubricating film. The hydraulic fluid may be contained primarily towards the top end 40 of the primary cylinder 24 and the bottom end 42 of the secondary cylinder 26. The primary piston 28 and the secondary piston 30 may include at least one circumferential-seal 44 to prevent hydraulic fluid from leaking to other portions of the chambers of the primary 24 and secondary 26 cylinders. The circumferential seal may be made of silicone or other suitable materials.

Electroosmosis is ordinarily associated with DC (direct current) electric field, which is used to generate a steady-state mono-directional electroosmotic flow. An AC (alternating current) electric field may also be applied to induce electroosmosis. However, the electroosmotic flow then becomes time and frequency dependent, with an oscillating flow direction. A frequency-dependent excitation electric field may be applied across a non-conductive capillary with single sealed ends to induce electroosmosis. Each capillary may be filled with an aqueous liquid. Since each capillary is sealed at one end, there is no net flow of ions and this builds up the pressure in each capillary. This pressure can be converted into an actuating force.

In a preferred embodiment of the present invention, the primary cylinder 24 may contain hundreds or thousands of microcapillaries bundled together in a lower end 36 of the primary cylinder 24. For ease of fabrication, a porous material 38 (as shown) filled/soaked with an electrically conducting or an aqueous solution may be used in place of the microcapillary bundles. The porous material 38 may be made of electrically non-conducting materials.

Mathematical models have been developed to analyze the frequency-dependent electroosmotic flow in empty or packed microcapillaries. The corresponding Navier-Stokes equation is solved using the Green's function method and the complete Poisson-Boltzmann equation governing the EDL potential field is solved under an analytical scheme for arbitrary zeta potentials. When both capillary ends are closed, the oscillating flow independently generated by the AC electroosmosis is balanced by the oscillating counter-flow.

While operating the electrokinetic actuator 20, an AC power supply 46 (or any sinusoidal power supply) with a switch 47 may be applied across the porous material 38 which is filled/soaked with an electrically conducting, any aqueous liquid, or any ionic solution such as, for example, demonized water. With the AC power supply 46 turned on, an oscillating electrical field generated causes the ions in porous channels of the porous material 38 to flow in an oscillating manner. As the porous channels of the porous material 38 simulates closed channels, the oscillating electrical field causes the liquid flow at the central part of these porous channels in the porous medium 38 to change direction often, creating a high pressure gradient in the porous channels in the porous medium 38. This high pressure gradient generates a high back pressure in the porous channels in the porous medium 38. The back pressure in the porous channels in the porous medium 38 may be used to push/move the primary piston 28 in the primary cylinder 24. The primary piston 28 compresses the hydraulic fluid in the top end 40 of the primary cylinder 24 and the bottom end 42 of the secondary cylinder 26. The compressed hydraulic fluid then pushes/moves the secondary piston 30 of the secondary cylinder 26.

The secondary piston 30 may be connected to an actuation cylinder 50 that provides linear actuation to external applications/devices. The difference in the bore sizes of the primary cylinder 24 and the secondary cylinder 26 creates a displacement amplifier effect because of the non-compressitivity of the hydraulic fluid. The volume of hydraulic fluid forced out of the primary cylinder 24 by the movement of the primary piston 28 will be the same volume of hydraulic fluid forced in the secondary cylinder 26. The smaller bore size of the secondary cylinder 26 compared to the bore size of the primary cylinder 24 allows the actuator 20 to be used in situations where large amplitudes of actuation are required. Based on the principle of conservation of fluid, the amplitude of actuation of the actuating cylinder 50 is the amplitude of motion of the primary piston 28 multiplied by the square of the diameter ratio of the primary piston 28 and the secondary piston 30. Hence, it can be seen that a slight movement by the primary piston 28 would induce a significant movement of the actuation piston 50, especially if the diameter ratio of the primary piston 28 and the secondary piston 30 is large. The converse is true when the secondary piston 30 falls from its highest position.

In an alternative embodiment, a DC power supply instead of an AC power supply may be used to work the actuator 20. The DC power supply may be linked to an on-off frequency controller that provides necessary on-off modulation for the system to simulate the sinusoidal oscillating patterns of an AC power supply. The DC power supply should preferably be of high voltage because of the high electric field required. The actuation frequency may be specified using the on-off frequency controller.

The lower end 36 of the primary cylinder 24 may include a compensating piston 52. The compensating piston 52 may be used to prevent the drop of pressure in the porous channels of the porous material 38 during the operation of the actuator 20 due to the displacement of the primary piston 28.

A vent 54 may be incorporated at the lower end 36 of the primary cylinder 24. The vent 54 may be used to facilitate the movement of the compensating piston 52. The vent 54 allows the compensating piston 52 to return to its rest position when the primary piston 28 returns to its own rest position by exposing the void in the housing 22 created by the movement of the compensating piston 52 to atmospheric pressure.

Simulations have been carried out to determine the characteristics of different parameters in a sealed micro-capillary during frequency-dependent electroosmotic flow. The simulations and calculations were carried out based on a set of fixed parameters. The working fluid was NaCl (sodium chloride) with valence of 1 at 293 K and with density, viscosity and dielectric constant of 10000 kg/m$^3$, 9×10$^{-4}$ Ns/m$^2$ and 80, respectively. The reference velocity was set at 1 mm/s and the electric field for both DC and AC were applied with a field strength of 1000V/m. The characteristic hydraulic diameter of the micro-capillary was set at 57 μm. Other important parameters were a characteristic time t*=155.3 μs with a corresponding eigen-frequency of f*=6.44 kHz.

Figure 2:
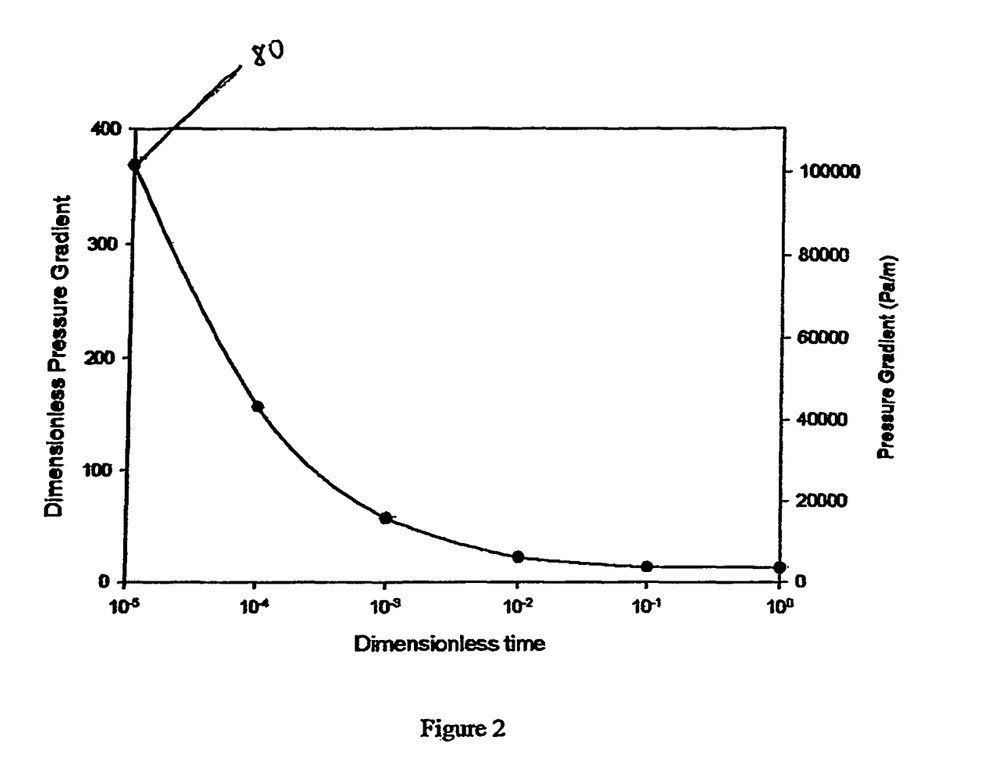
FIG. 2 is a graph of pressure gradient against time in a micro-capillary of a preferred embodiment when a DC electric field is applied.

FIG. 2 shows that in the instance of a DC electric field applied to a micro-capillary, the highest magnitude of the pressure gradient (80) is generated during time first instant immediately after the application of an electric field. It can be seen from FIG. 2 that the pressure gradient gradually decreases thereafter and eventually attains a steady state of a low pressure gradient.

Figure 3:
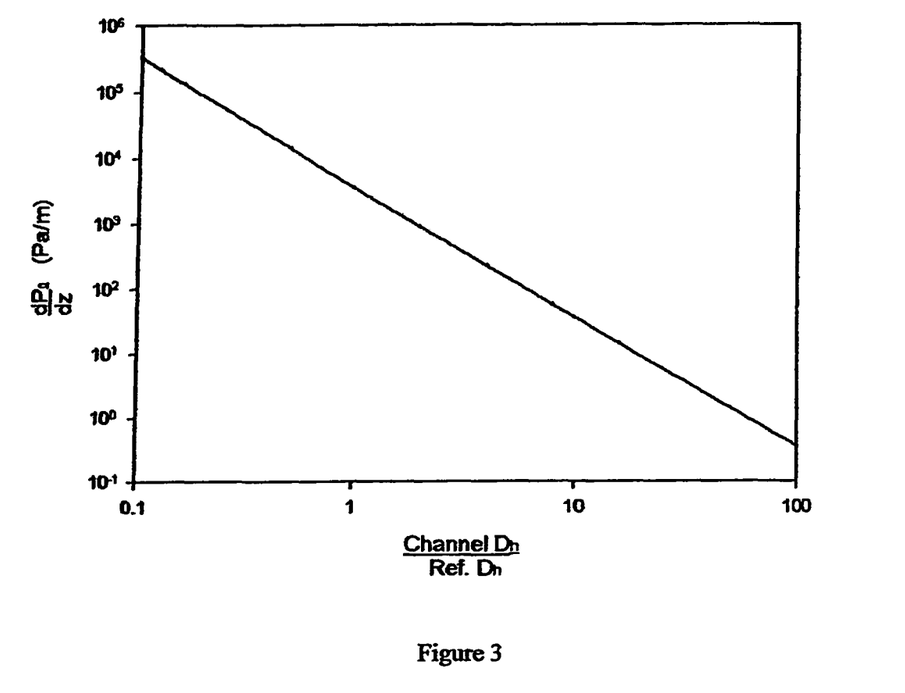
FIG. 3 is a graph of pressure gradient against ratio of the hydraulic diameter of a micro-capillary to a reference diameter with a geometric size of 40×100 μm when a DC electric field is applied.

FIG. 3 shows a graph of pressure gradient against a ratio of a hydraulic diameter of a micro-capillary to a reference diameter with a geometric size of 40×100 μm when a DC electric field is applied. The negative gradient of FIG. 3 suggests that as the size of the micro-capillary increases, the magnitude of the pressure generated in the chamber decreases.

Figure 4:
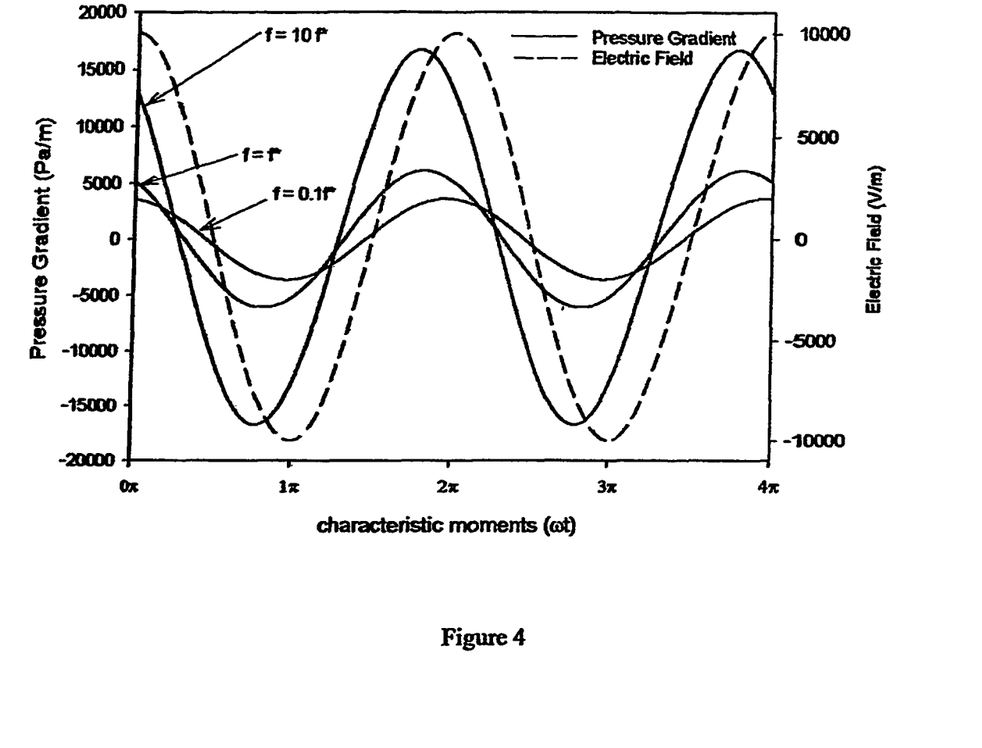
FIG. 4 is a graph of pressure gradient against characteristic moments in a micro-capillary of a preferred embodiment when an AC electric field is applied.
Figure 5:
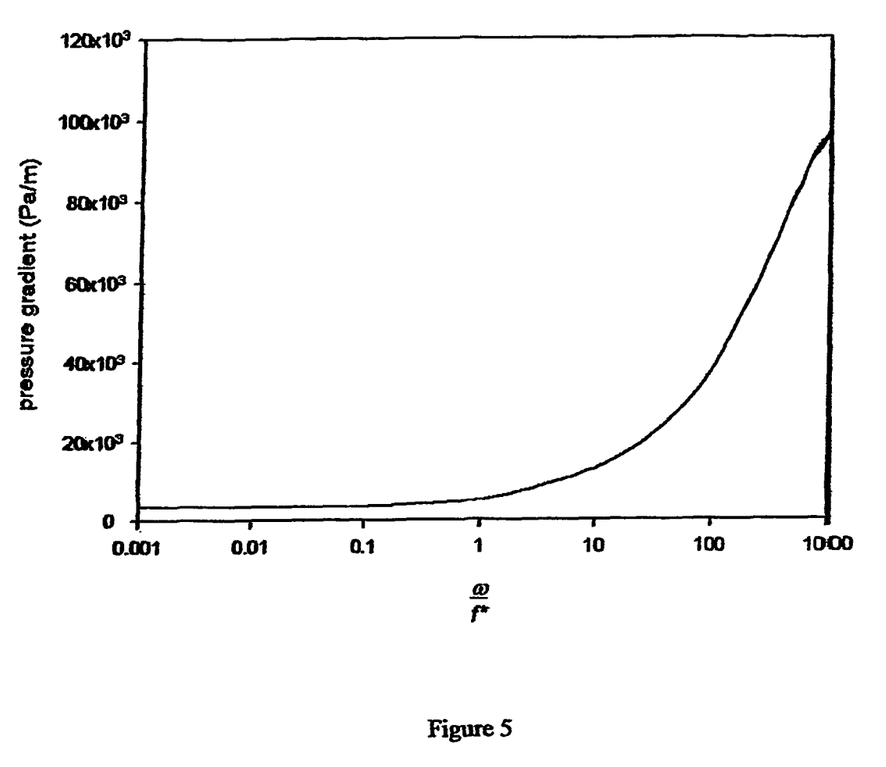
FIG. 5 is a graph of pressure gradient against ratio of applied frequency to characteristic frequency f* in a micro-capillary of a preferred embodiment when an AC electric field is applied.

FIGS. 4 and 5 show the behaviour in the micro-capillary that occurs when an AC supply electric field is applied to a micro-capillary. FIG. 4 shows a graph of pressure gradient against characteristic moments in a micro-capillary of a preferred embodiment of the present invention when an AC electric field is applied. FIG. 4 shows that at higher excitation frequencies, for example, when f=10f*, the larger the oscillation in values of the pressure gradient.

FIG. 5 shows a graph of pressure gradient against a ratio of applied frequency to characteristic frequency f* in a micro-capillary of a preferred embodiment of the present invention when an AC electric field is applied. As denoted in FIG. 5, the supply frequency should exceed the characteristic frequency f* in order to attain a high pressure gradient within a micro-capillary. It can also be seen that when the ratio of applied frequency to characteristic frequency f* (dimensionless excitation frequency) exceeds the value of 100, the magnitude of the pressure gradient increases linearly with the magnitude of the dimensionless excitation frequency, and correspondingly, the supply frequency.

The force required for the actuation of the primary piston 28 may depend on various factors. Higher forces may be attained by utilizing a porous medium 38 with small pores sizes. It should be noted that the overlapping of EDLs should be avoided to maximize the amount of force generated. Other approaches to attaining greater forces include using a lower concentration of the electrolyte solution, using a larger cross-sectional area of a porous column, and using a stronger electric field. Forces in excess of 2 KN may be obtainable from the use of a 0.1 m diameter porous column.

The actuator 20 is a simple design with few moving parts that is not complicated in construction. Each actuator 20 requires minimal maintenance, if any. The materials used to manufacture the actuator 20 may include metals, silica, ceramic and plastics. The materials used and the corresponding material costs would be determined by the environment that the actuator 20 is employed at The cost of manufacture would be low as the actuator 20 may be manufactured using existing manufacturing techniques and technology.

The actuator 20 is an energy-efficient device. Although the applied voltage to generate an electric field is relatively high, the current drawn is low and correspondingly, power consumption is low as well.

The actuator 20 may be used in a myriad of different applications ranging from situations that require precision micro actuation, to situations that require large displacement linear actuation such as in a linear motor. It may be unnecessary to use a displacement amplifier in the actuator 20 for precision micro actuation. The actuation may be obtained directly from the primary piston 28.

The actuator 20 may be used in applications involving linear actuations. The actuation may be in nano, micro or macro scales. The actuator 20 may also be used for positioning in relevant fields of applications.

The actuator 20 may be used as a precision actuator as its actuation can correspondingly be controlled precisely since the displacement of the actuator 20 is proportional to the applied electric field strength. As such, the actuator 20 may be employed to replace piezo-actuators. The actuator 20 may also be employed in a hard disk drive to position the head arms to different tracks on the surface of the platter during the writing/retrieval of data. Similarly, the actuator 20 may be used as a precision micro-actuator in cameras, microscopes or any applications that require precision linear or possibly even rotational actuation. For larger amplitudes, of actuation, a linear displacement amplifier (as described earlier) may be used to amplify the amplitude of displacement.

In an alternative application, the actuator 20 may be employed as a linear motor. It may be possible to generate larger linear displacements from the actuator with the aid of a mechanical displacement amplifier. The actuator 20 may be used in various scales as a linear motor in delivering linear actuations such as, for example, driving linear air compressors or refrigeration compressors for air-conditioners or refrigerators or in a miniature refrigeration system for CPU cooling. The fabrication of the miniature refrigeration compressor may be possible because of the miniaturisation of the actuator 20. The actuator 20 may also be used for hydraulic or pneumatic actuations.

The actuator 20 may also be used for precision positioning applications. As the pressure generated by such actuators 20 may attain very high levels (in excess of 100 atmospheric pressures), it may thus be suitable for applications in static and dynamic nano, micro and macro positioning, depending on the design parameters of the actuator 20.

Whilst there has been described in the foregoing description preferred embodiments of the present invention, it will be understood by those skilled in the technology concerned that many variations or modifications may be made to details of design or construction without departing from the present invention.

The present invention extends to all features disclosed either individually, or in all possible permutations and combinations.

The invention claimed is:

1. An actuator comprising:
   a tube with an open end and an inner surface being formed of a porous material having porous channels that are at least partially filled with a liquid containing an electrolyte, the inner surface being electrically chargeable when in contact with the liquid;
   an electric field generator to generate an alternating current (AC) electric field along a lengthwise axis of the tube to induce a pressure in the liquid; and
   an object in fluid communication with the liquid in the tube through the open end such that the pressure in the liquid exerts a force on the object;
   wherein the force on the object is able to actuate the object.

2. The actuator of claim 1, wherein the inner surface is electrically chargeable due to electrochemical phenomena.

3. The actuator of claim 1, wherein the porous channels are selected from the group consisting of: capillary tube and micro-capillary tube.

4. The actuator of claim 1, wherein the porous material includes one of: silica, and ceramics.

5. The actuator of claim 4, wherein the porous material has at least one material property selected from the group consisting of: electrically non-conductive, porous structure, micro capillaries, small particles, and hydrophilic.

6. The actuator of claim 4, wherein when one of: the porous channels have a small size: the porous channels have a large cross sectional; the liquid containing electrolytes has a relatively low concentration; and the electric field is relatively strong, a higher force on the object is generated.

7. The actuator of claim 4, further comprising a compensating piston to prevent a drop of pressure in the porous material.

8. The actuator of claim 1, wherein the pressure in the liquid is caused by electroosmotic flow.

9. The actuator of claim 1, further comprising a housing defining a chamber containing the tube, and a cylinder in fluid communication with the chamber, wherein the tube is in the cylinder and the object is a piston slideably mounted in the cylinder.

10. The actuator of claim 9, wherein the piston is biased to resist a force exerted thereon from the tube.

11. The actuator of claim 10, further comprising a displacement amplifier operatively connected to the piston.

12. The actuator of claim 9, wherein the piston has silicone seals.

13. The actuator of claim 9, further comprising a vent in the housing for allowing the exchange of air within the chamber.

* * * * *